(12) United States Patent
Nelson et al.

(10) Patent No.: US 7,080,324 B1
(45) Date of Patent: Jul. 18, 2006

(54) CONTROL FOR A GRAPHICAL USER INTERFACE SUPPORTING COUPLED VARIABLES AND METHOD OF OPERATION THEREOF

(75) Inventors: Alan C. Nelson, Fort Collins, CO (US); Janice G. Ryles, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 977 days.

(21) Appl. No.: 09/686,588

(22) Filed: Oct. 11, 2000

(51) Int. Cl.
*G06F 3/00* (2006.01)

(52) U.S. Cl. ..................... 715/771; 715/786; 715/833; 715/843; 715/974

(58) Field of Classification Search ................ 345/786, 345/771, 700, 833, 843, 845, 974; 715/700, 715/771, 786, 833, 843, 974
See application file for complete search history.

(56) References Cited

U.S. PATENT DOCUMENTS

| | | | |
|---|---|---|---|
| 5,615,347 A | | 3/1997 | Davis et al. |
| 5,850,531 A | | 12/1998 | Cox et al. |
| 6,229,456 B1 * | | 5/2001 | Engholm et al. ............. 341/35 |
| 6,289,207 B1 * | | 9/2001 | Hudecek et al. ......... 455/150.1 |
| 6,438,580 B1 * | | 8/2002 | Mears et al. ................ 709/204 |
| 6,452,612 B1 * | | 9/2002 | Holtz et al. ................. 345/723 |
| 6,518,984 B1 * | | 2/2003 | Maeckel et al. ............ 345/786 |
| 6,522,345 B1 * | | 2/2003 | Alexander .................. 345/771 |
| 6,542,692 B1 * | | 4/2003 | Houskeeper ................. 386/52 |

FOREIGN PATENT DOCUMENTS

| | | |
|---|---|---|
| FR | 2797069 | 7/1999 |
| WO | WO 00/21200 | 4/2000 |
| WO | WO 00/36496 | 6/2000 |

\* cited by examiner

*Primary Examiner*—Weilun Lo
*Assistant Examiner*—Mylinh Tran

(57) ABSTRACT

A variable control displayed through a graphical user interface and linked to a control element. The variable control has graphical representations of readily identifiable and easy to use controls. These controls include at least one text box to display a value. The displayed value can be set by default, or to show the current state of the control element. The variable control also includes at least one range box for assigning a range unit that corresponds to the text box. The variable control also includes a slider control that is linked to the text box and is used to make coarse adjustments to the value displayed in the text box. A spinner is also linked to the text box and is used to make fine adjustments to the displayed value. In a preferred embodiment, the user can select a digit or several digits within the displayed value and adjust only the user-selected digit or digits. Also in a preferred embodiment, the range box automatically updates the range unit when the displayed value is adjusted beyond a predetermined range limit.

25 Claims, 5 Drawing Sheets

PRIOR ART

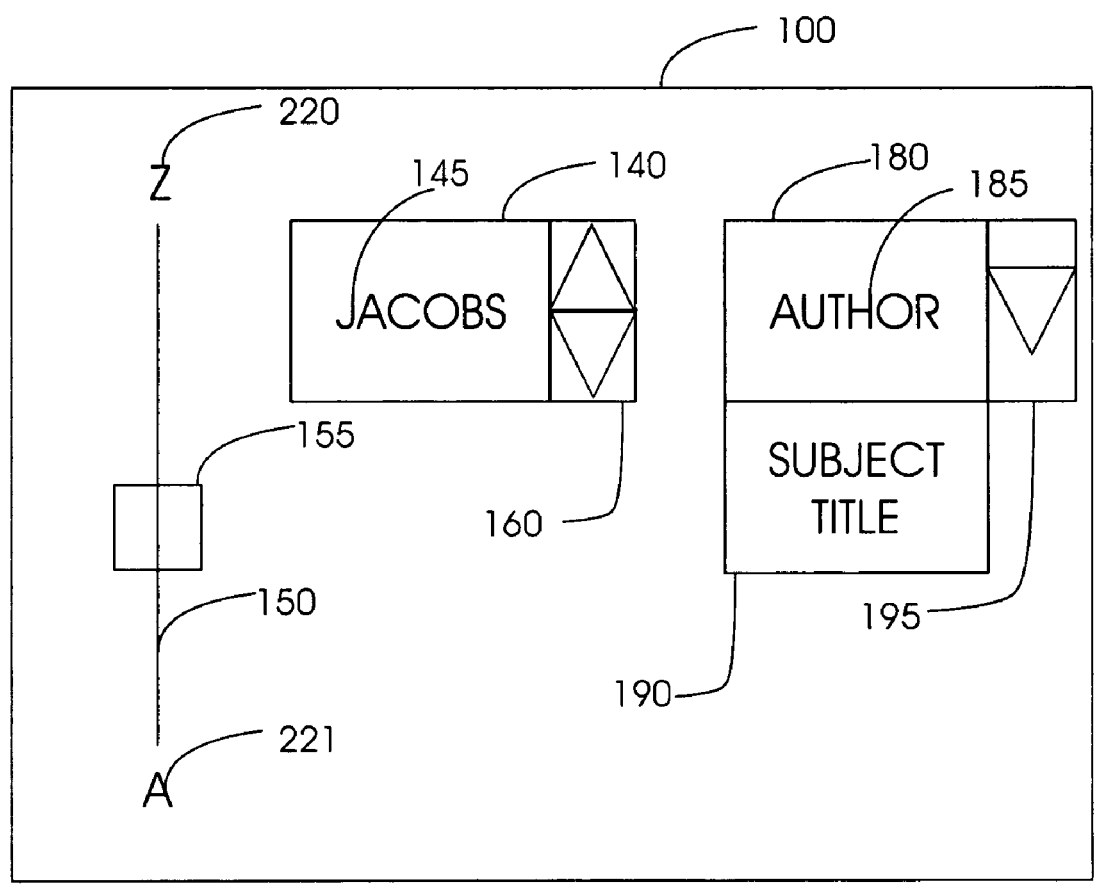

CONTROL FOR A GRAPHICAL USER INTERFACE SUPPORTING COUPLED VARIABLES AND METHOD OF OPERATION THEREOF

FIELD OF THE INVENTION

The invention pertains to a control for display through a graphical user interface supporting coupled variables updated automatically when a coupled variable changes, and a method of operation of the control to make coarse and fine adjustments to a control element.

BACKGROUND OF THE INVENTION

Equipment controls (e.g., stereo, pulse generator, and other electronic equipment knobs) have been simulated for display through a graphical user interface (GUI) on a computer monitor or other display device. For example, graphical representations of stereo volume control knobs or rotary pulse generator (RPG) frequency setting knobs are conventionally displayed through the GUI as round knobs to minimize physical knobs. To adjust the settings (e.g., the volume or frequency), the user positions the cursor on the graphical representation of the knob using a PC mouse, touch pad, or other suitable cursor control device, and then clicks and holds down the PC mouse button to drag the cursor in a circular motion. This operation requires user dexterity and often many turns of the knob to achieve the required value. In addition, graphical representations of knobs are not standard for use with GUI applications and many computer users are therefore unaware of how to operate these knobs.

Text boxes are also commonly used to receive keyboard input for adjusting a setting (e.g., selecting a specific frequency) or to input a research request (e.g., the "Search" command on many databases). However, text boxes typically require the user to enter a specific numeric or text value and often do not permit the user to adjust the setting or research request without entering another value. As such, the user is required to know the specific value even if only an approximation is required or desired. In addition, keyboard input is error prone, and it takes time for the user to input the value (e.g., the user must remove their hand from the PC mouse to use the keyboard).

It is therefore a primary objective of the present invention to provide a variable control for display through a GUI that uses graphical representations of components that are familiar to an experienced computer user and that are readily understood by new users.

Another object of this invention is to provide a variable control that is easily operable with a PC mouse or other cursor control device. Yet another object is to provide the user with means to make both coarse and fine adjustments to the displayed value.

SUMMARY OF THE INVENTION

In the achievement of the foregoing objects, the inventors have devised a variable control and method for operation thereof. The variable control includes graphical representations of components that are familiar to experienced computer users and readily understood by new users. Various embodiments of the graphical representations of components can be used to make coarse and/or fine adjustments to a control element, such as, but not limited to test and measurement equipment, that is linked to the variable control.

The variable control has at least one text box to display a value to be set (e.g., a numerical frequency or volume, a character string, etc.). The displayed value can preferably be set by default to a predetermined value, can be entered from a keyboard, set based on the pre-existing setting of the control element (e.g., via communication with the control element over a network), or can be set by a combination thereof. Thus, the variable control can be used to enter specific values or approximations. In addition, the variable control may also include at least one range box for assigning a range unit (e.g., kHz, MHz, etc.) that corresponds to the text box or boxes. For example, where a single text box is used, the range box will correspond to that single text box. Where multiple text boxes are used, however, a single range box can correspond to each of the multiple text boxes, multiple range boxes can each correspond to individual text boxes, or any combination thereof. Preferably, the range box is a pull-down menu having a plurality of predetermined range units listed therein.

Once the variable control has been initially set, either by default, based on a pre-existing condition, by receiving keyboard input, etc., a slider control functionally linked to the text box is used to make coarse adjustments to the displayed value. A spinner is also functionally linked to the text box and is used to make fine adjustments to the displayed value. Preferably, the spinner is an arrow pair (i.e., an up-arrow, and a down-arrow) that is selected by the cursor using a PC mouse or other suitable cursor control device to increase or decrease the displayed value. In a preferred embodiment, the user can select a particular digit or digits within the displayed value to adjust using the slider control and/or spinner. For example, the user can select the digit "0" within the displayed value "1.03" to adjust the tenth decimal of the displayed value (e.g., to "1.23"). Also in a preferred embodiment, the range box automatically updates the range unit when the displayed value is adjusted beyond a predetermined range limit. For example, when the displayed value of 999 kHz is adjusted upward to 1000 kHz, the range box is automatically updated from kHz to MHz, and the value 1.0 is displayed by the text box. The slider control is also preferably automatically updated (e.g., to range between 1.0 MHz and 1000 MHz). Also, when the setting of the control element 130 changes due to other events, such as another remote user on the network making changes to the control element 130, the display is preferably immediately updated to reflect the change, and each element, such as the slider position, range and limits, dependent spinners, etc., are updated accordingly.

Furthermore, a real time measurement selector is also provided so that any adjustments made with the variable control can be either simultaneously transmitted to the control element (i.e., dynamically or in "real time") or transmitted once an adjustment is finalized by the user (i.e., non-dynamically). For example, when the variable control and the control element are linked via a "fast" connection, the adjustments can be transmitted to the control element dynamically or in "real time", whereas when the variable control and the control element are linked via a "slow" connection, the adjustments can be made first and then transmitted to the control element when the user clicks on the "OK" or "APPLY" button.

The graphical representations of the variable control (i.e., the text box, the slider control, the spinner, and the range box with pull-down menu) are familiar to an experienced computer user and are readily understood by new users. In addition, the variable control is easily operable with a PC mouse or other cursor control device. These and other important advantages and objectives of the present invention will be further explained in, or will become apparent from, the accompanying description, drawings and claims.

BRIEF DESCRIPTION OF THE DRAWINGS

Illustrative and presently preferred embodiments of the invention are illustrated in the drawings in which:

FIG. 8 shows an embodiment of the variable control of the present invention for text-based research.

DESCRIPTION OF THE PREFERRED EMBODIMENT

Figure 1:
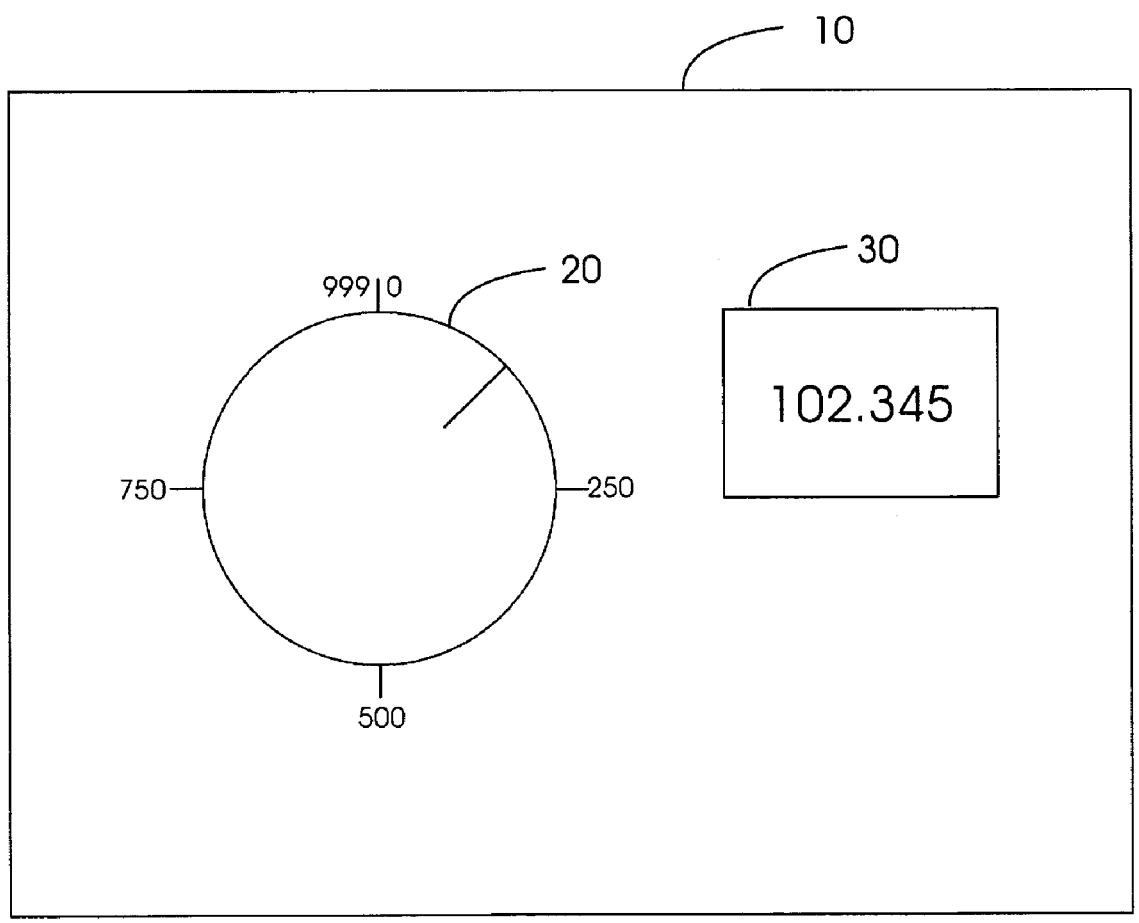
FIG. 1 is a prior art graphical representation of a variable control.

FIG. 1 shows a prior art controller 10 (e.g., for use with a rotary pulse generator or stereo volume control) having a graphical representation of a knob 20 and a display box 30. To operate the prior art controller 10, the user clicks the knob 20 with a conventional cursor control device (e.g., the PC mouse), and while holding the PC mouse button, rotates the knob 20 using the PC mouse until the desired value is displayed in the display box 30. Alternatively, the user can click on the display box 30 and directly input the desired value (e.g., by highlighting the display box 30 with the PC mouse, and typing a value using a conventional keyboard).

Figure 2:
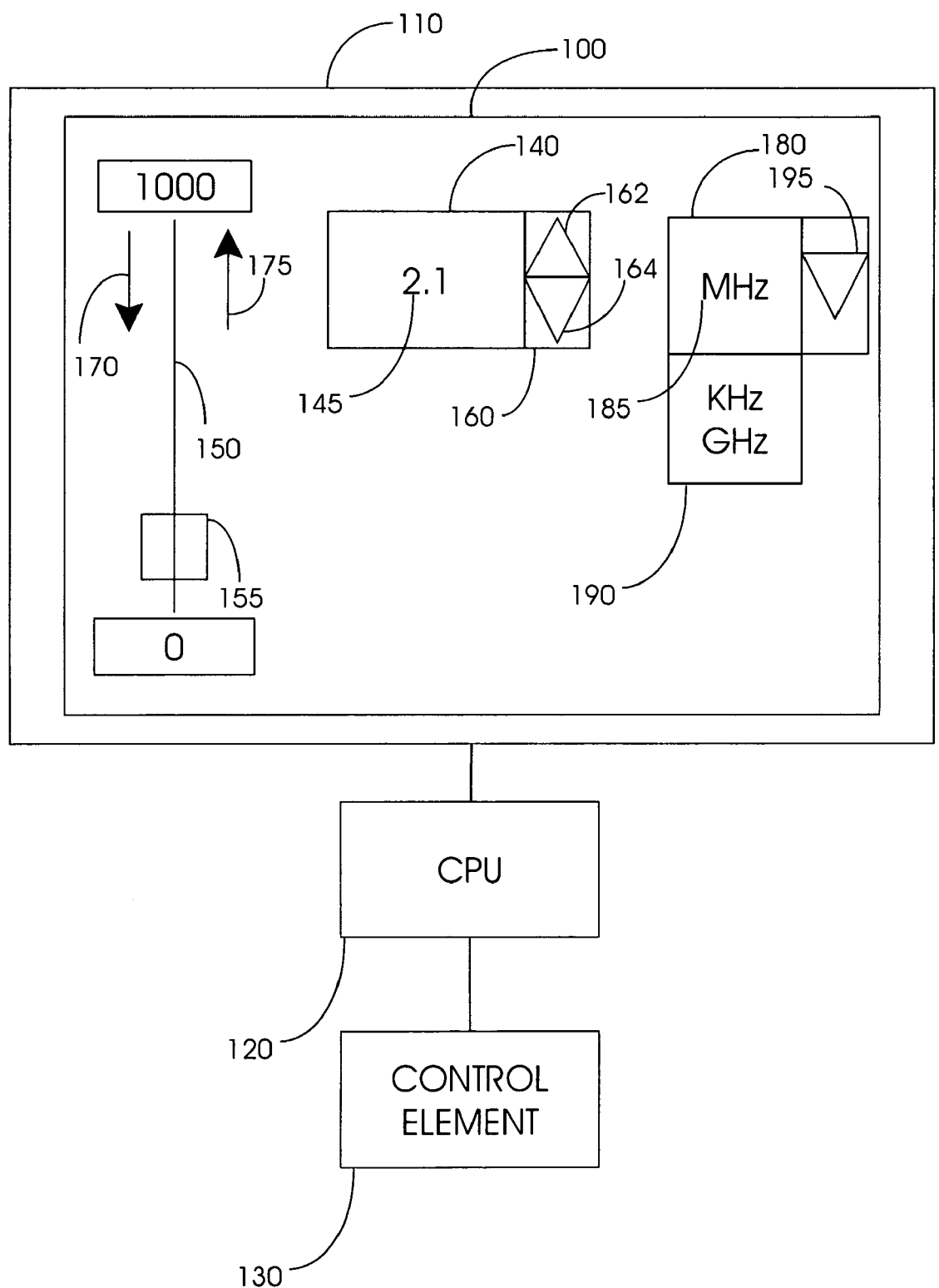
FIG. 2 is a block diagram showing components for use with the variable control of the present invention.

FIG. 2 shows a variable control 100 of the present invention. The variable control 100 is displayed through a graphical user interface or GUI 110 (e.g., the Microsoft WINDOWS® Operating System displayed through a conventional display device such as a computer monitor, television, LCD, etc.) and connected through a conventional CPU 120 (e.g., an Intel PENTIUM® with associated PC mouse, keyboard, memory, and other hardware and software) to configure a linked control element 130 (e.g., a pulse generator, a database, etc.). The variable control 100 generally comprises: a text box 140 for displaying a value 145, a slider control 150 which is functionally linked (i.e., by the variable control software) to the text box 140, and a spinner 160, which is also functionally linked to the text box 140. Preferably, the variable control 100 also includes a range box 180 to display range units 185 (e.g., units of measurement, research categories, etc.) that correspond to the value 145 displayed in the text box 140. Also in a preferred embodiment, a drop-down menu 190 that can be conventionally activated using the PC mouse (i.e., by "clicking" on the arrow 195 and making the desired selection) is displayed next to the text box 140.

The text box 140 displays a value 145 to be set and/or adjusted (e.g., a numerical value such as a frequency or volume, a character string, etc.). The displayed value 145 can be set by default to a predetermined value, can be entered from a keyboard, set based on the pre-existing setting of the control element (e.g., via communication with the control element over a network), or can be set by a combination thereof. Thus, the variable control 100 can receive specific values or approximations of displayed value 145, which can in turn be adjusted using the slider control 150 and the spinner 160.

The slider control 150 is used for coarse adjustments to the displayed value 145. For example, the user selects a handle 155 on the slider control 150 by moving the cursor and "clicking and holding" with a PC mouse (or using any other suitable cursor control device such as a touch pad, keyboard, etc.). The user then moves or slides the "thumb" or handle 155 along the length of the slider control 150 (i.e., in the direction of arrow 170 or arrow 175) to coarsely adjust the displayed value 145. For example, when the handle 155 is moved in the direction of arrow 170, the displayed value 145 decreases by coarse increments such as ten or one hundred. Similarly, when the handle 155 is moved in the direction of arrow 175, the displayed value 145 increases by like increments. Alternatively, the value can increase in finer increments. However, the nature of the slider is not well suited to fine adjustments and is instead better utilized for "searching" the related instrument spectrum or database for gross anomalies.

The spinner 160 is preferably an arrow pair and is used for fine adjustments to the displayed value 145. For example, the user selects an arrow 162 or 164 (i.e., by "clicking" on one of the arrows 162, 164) using a PC mouse or other suitable cursor control device. Each time the arrow 162 or 164 is selected (i.e., with each "click"), the displayed value 145 is finely adjusted. For example, when arrow 162 is selected, the displayed value 145 increases by small or fine increments such as one or a fraction thereof. Similarly, when the arrow 164 is selected, the displayed value 145 decreases by like increments.

It is understood that any suitable display device and GUI 110, CPU 120, and control element 130 can be used under the teachings of the present invention. Likewise, the display device and GUI 110, the CPU 120, and the control element 130 can be linked to one another using any suitable means, including but not limited to hardwired connections, infrared connections, via satellite, connected through a network or over the Internet or an Intranet using a dial-up connection (i.e., using a modem) or a direct connection (e.g., cable, DSL, T-1, etc.).

In addition to providing a mechanism for choosing control values for the control element 130, the display device can also display an initial or default setting that the control element 130 may have or a prior setting from the last use of the control element 130. Also, when the setting of the control element 130 changes due to other events (e.g., another remote user on the network makes a change to the control element 130), the display is preferably immediately updated to reflect the change, and all elements (e.g., slider position, range and limits, dependent spinners, etc.) are updated accordingly. Programming the CPU 120 to display graphical representations such as those described herein and to control the output to the control element 130 in response to input received at the variable control 100 is conventionally known and well understood in the art.

Figure 3:
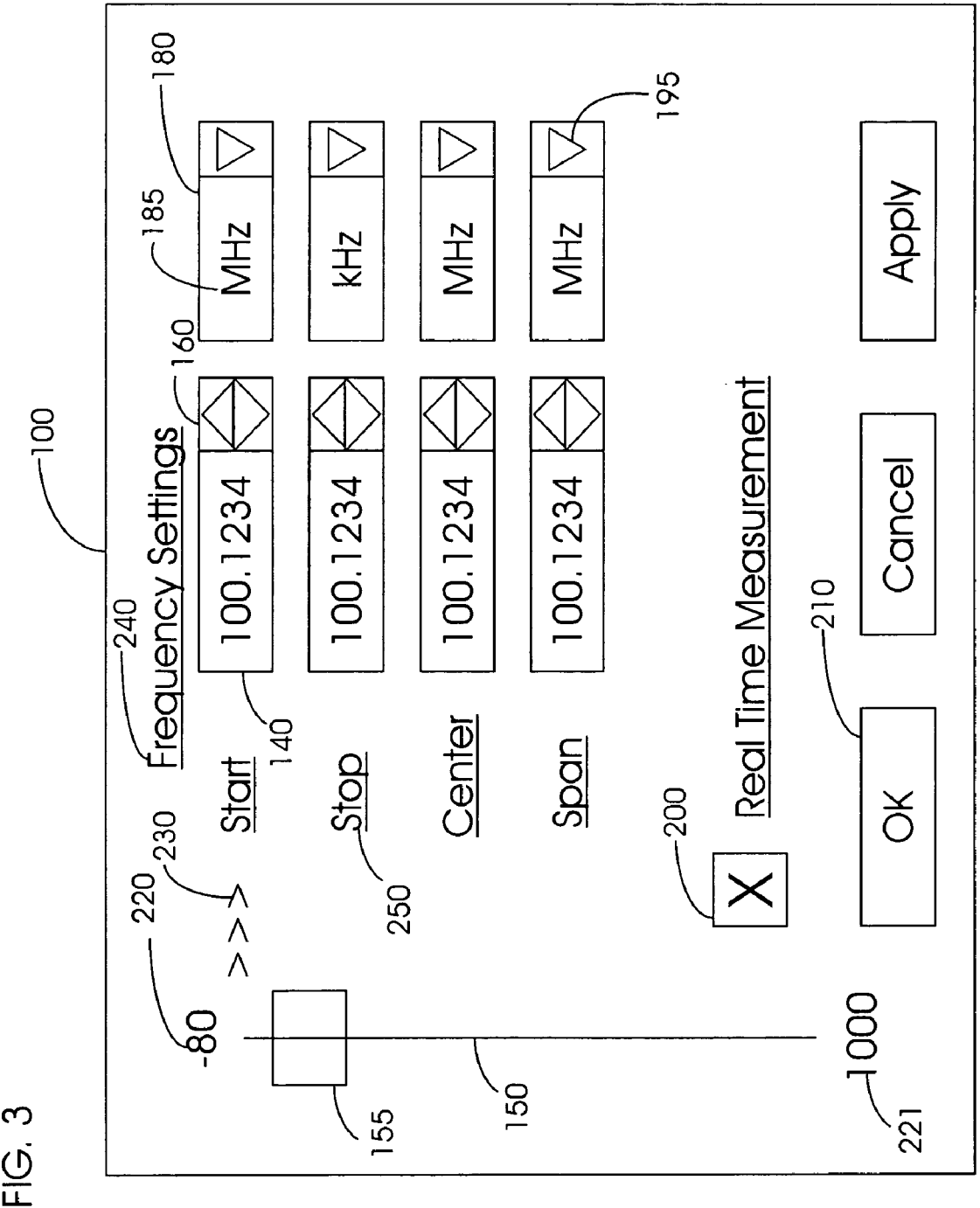
FIG. 3 shows an embodiment of the variable control of the present invention for use with an instrument.

It is also to be understood under the teachings of the present invention that any suitable adjustment increments can be used. For instance, the adjustment increment can be a multiple digit, a single digit, a decimal digit, etc. The definition of coarse adjustment and fine adjustment will depend on design considerations such as the application (i.e., on the control element 130 and/or its use). Furthermore, more than one text box 140 can be displayed as part of the variable control 100 under the teachings of the present invention. For example and as shown in FIG. 3, a plurality of text boxes 145 are shown. Each text box shown in FIG. 3 corresponds to a frequency adjustment for the attached control element 130 (i.e., a rotary pulse generator). Likewise, more than one slider control 150 (only one shown), one or more spinners 160 (see FIG. 3 for an example of a plurality of spinners), and more than one range box 180 (see FIG. 3), or any combination thereof, can also be displayed as part of the variable control 100 under the teachings of the present invention. For example, multiple slider controls can be used where each slider control corresponds to varying degrees of coarse adjustment. That is, a first slider control for coarse adjustments of increments of one thousand, another slider control for coarse adjustments of one hundred, etc. Also for example, a single spinner 160 can be shared with multiple text boxes 140, wherein the single spinner 160 is functionally linked to adjust the displayed value 145 in a selected one of the multiple text boxes 140. However, due to the smaller size of the spinner 160, preferably there are separate spinners for each text box 140. As another example, different range units 185 can be simultaneously displayed in each range box 180. That is, the range unit "kHz" can be displayed one range box 180 while the range unit "MHz" is displayed in another range box 180 (see FIG. 3). Alternatively, the range box 180 need not be provided under the teachings of the present invention. For instance, the range unit 185 can be omitted altogether from the variable control 100, the range unit 185 can be separately displayed as part of the text box 140, or the range unit 185 can be set in an "options" or "preferences" menu or dialog box.

Preferably, the adjustments made at the variable control 100 are transmitted dynamically or in "real time" to the control element 130. Therefore in a preferred embodiment, a "REAL TIME MEASUREMENT" (RTM) selector 200 is displayed as part of the variable control 100. The RTM selector 200 is preferably provided for use when the variable control is linked to the control element 130 by a "fast" connection (e.g., hard-wired, DSL, ISDN, or other dedicated connection) in order to update the control element 130 in "real time". That is, when the user enters a value 145 and makes adjustments thereto, the input is simultaneously transmitted by the CPU 120 to the control element 130. Preferably, such a "real time" measurement selector 200 is displayed as a checkbox, button, or other suitable graphical representation so that the input is either simultaneously transmitted to the control element 130 or transmitted only once all adjustments have been made, at the option of the user. For example, where the variable control 100 is being used at a remote location from the control element 130 and the user has a "slow" connection (e.g., a dial-up connection via a modem), the user can first adjust each setting (i.e., the displayed value 140) and then select the "APPLY" or "OK" button 210, described below, to transmit the final setting (i.e., displayed value 145 once adjusted) to the control element 130, thus preserving bandwidth.

Conventional buttons 210, such as "OK", "CANCEL", and "APPLY", can also be displayed and functionally linked through the CPU 120 to the control element 130. In use, for example, once the displayed value 145 has been set by the user and the user selects "APPLY", the displayed value 145 is transmitted to the control element 130. Other buttons can be used in place of or in addition to those shown in FIG. 3, and it is understood that these buttons are merely illustrative of buttons that can be used with the variable control 100 of the present invention.

Additional graphics are also provided on the variable control 100 in the preferred embodiment. These include limits 220 and 221 (FIG. 3) displayed at either end of the slider control 150. Indeed, increments can also be shown along the length of the slider control 150. An indicator 230 is also shown in FIG. 3 to indicate to the user that a particular text box 145 is selected for adjustment (i.e., the "START" text box 145 has been selected in FIG. 3 as indicated by arrows 230). It is understood that any suitable indicator 230 can be used, including for example, highlighting or shading. Labels 250 are also displayed on the variable control 100. For example in FIG. 3, where the variable control 100 is used in conjunction with a pulse generator (i.e., the control element 130), labels 250 such as "START", "STOP", "CENTER", and "SPAN" corresponding to the frequency to be adjusted are shown. Also shown in FIG. 3 is a title 240 (i.e., "FREQUENCY SETTINGS"). Any suitable limits 220, 221, labels 240 and title 250 can be displayed on the variable control 100, and will vary based on design considerations such as the control element 130, user options, etc.

In a preferred embodiment, the variable control 100 of the present invention is linked through the CPU 120 to the internal settings of an instrument such as an incremental encoder, rotary pulse generator, or other instrument or electronic device (i.e., the control element 130). The variable control 100 is thus used to adjust the frequency settings of the control element 130 and the frequency settings are viewed via the Internet. Preferably an E44XX series or an E74XX series spectrum analyzer (both available from Agilent Technologies) are used in conjunction with the variable control 100 of the present invention. However, it is to be expressly understood that any suitable control element and any suitable analyzer, instrument, measurement device, or other piece of equipment can be used under the teachings of the present invention. Indeed, a spectrum analyzer need not be used in conjunction with the variable control 100 of the present invention. For example, the variable control 100 can be used with a database stored on the Internet, on CD-ROM, on magnetic disk, with other software, or even with other mechanical or electronic equipment such as stereos, televisions, vehicle diagnostics equipment, etc. Likewise, the variable control 100 can be used to adjust any suitable setting including, but not limited to, frequency, amplitude, time, a text-based search, etc.

Figure 4:
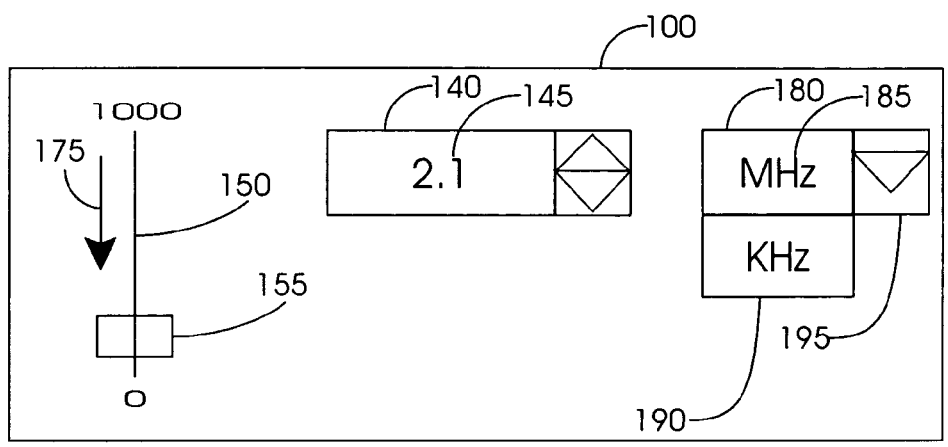
FIG. 4 shows an embodiment of the variable control of the present invention illustrating the initial settings for a displayed value.
Figure 5:
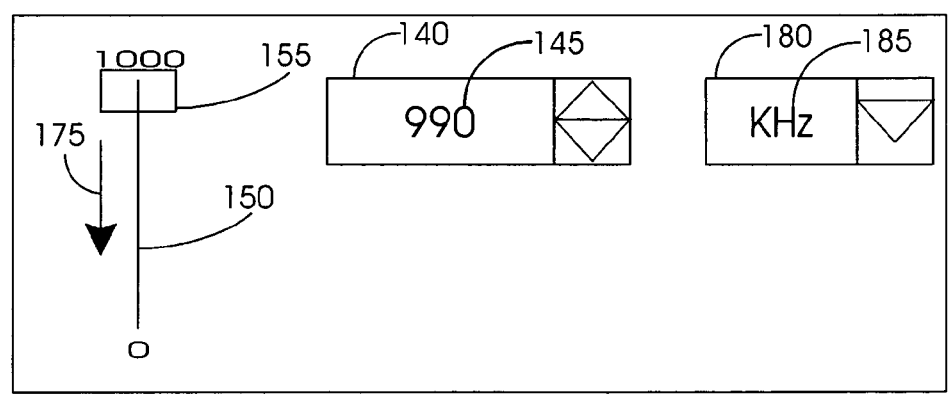
FIG. 5 is the variable control shown in FIG. 4 illustrating automatically updating a range unit and a slider control in response to an adjustment to the displayed value.

FIG. 4 through FIG. 7 illustrate a method to adjust a frequency setting using the variable control 100 of the present invention. In FIG. 4, the value 145 (i.e., "2.1") is displayed in the text box 140 and has been assigned the range unit 185 (i.e., "MHz") from the drop down menu 190. The user can enter the value 145 in the text box 140 (e.g., by selecting or highlighting the number "2.1" with the cursor and keying a new entry from a keyboard), or the value 145 can be displayed by default (e.g., the current setting). In either event, the handle 155 of the slider control 150 is displayed in a position corresponding to the displayed value 145. The CPU 120 changes the displayed value 145 relative to the position of the handle 155 of the slider control 150. In FIG. 4, the handle 155 is moved in the direction of arrow 175 to coarsely decrease the displayed value 145. Thus, as shown in FIG. 5, the displayed value 145 (i.e., "990" in FIG. 5) has been changed to reflect the adjustment made by another means (i.e., by the slider control 150 in this example). In addition, the assigned range unit 185 (i.e., "kHz" in FIG. 5)

is automatically updated (e.g., by the CPU 120) to reflect the coarse adjustment made using the slider control 150 when the displayed value is adjusted beyond a predetermined range limit (e.g., between range units). Preferably, the slider control 150 is also automatically updated (e.g., by the CPU 120) to reflect the new range of coarse adjustments (i.e., the handle 150 is displayed near the "1000" increment in FIG. 5 to reflect the displayed value 145 of "990", and a separate set of range limits 220, 221 can be displayed, if applicable).

The CPU 120 also adjusts the displayed value 145 relative to input received at the spinner 160. That is, the user selects one of the arrows 162, 164, and with each click of the PC mouse (or other input from a suitable cursor control device), the CPU 120 changes the displayed value by a fine increment (e.g., 5.0, 1.0, 0.1, etc.). In the illustration shown in FIG. 6, each time the user clicks on the arrow 164, the displayed value is decreased by ten units. In addition, the CPU 120 also changes the display so that the handle 155 is moved along slider control 150 to correspond to the displayed value 145.

Figure 6:
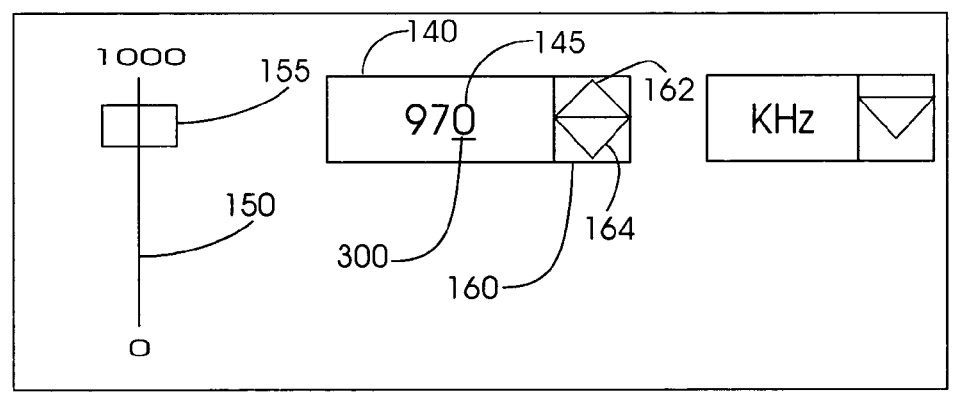
FIG. 6 is the variable control shown in FIG. 5 illustrating coarse adjustments to the displayed value.
Figure 7:
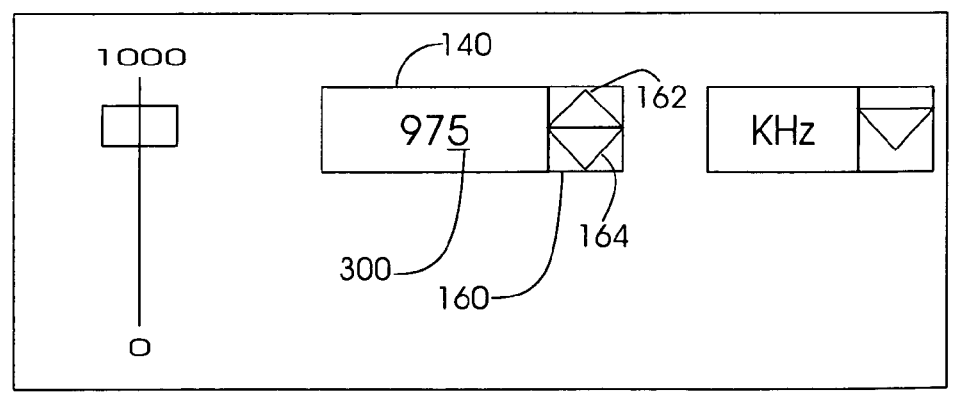
FIG. 7 is the variable control shown in FIG. 6 illustrating fine adjustments to the displayed value.

The displayed value 145 can be further adjusted when the user selects a particular digit 300 (FIG. 6) of the displayed value 145. Once a particular digit 300 is selected, input at the spinner 160 (i.e., "clicking" on arrows 162, 164) can be used to adjust only the particular digit 300. That is, when the digit "0" in FIG. 6 is selected, as indicated by the underline, and arrow 162 is "clicked" on, the selected digit 300 is finely adjusted by one to the desired setting (i.e., to the digit "5" shown in FIG. 7). When the range of the selected digit 300 is exceeded, the selected digit itself can "roll over". For example, where the selected digit "5" in FIG. 7 is adjusted beyond "9", the selected digit rolls over from "9" to "0" and the displayed value 145 becomes "970". Alternatively, the displayed value 145 can "roll over" when the selected single digit is adjusted beyond its range. For example, where the selected digit "5" in FIG. 7 is adjusted beyond "9", the displayed value 145 rolls over from "979" to "980".

FIG. 8 shows an alternative embodiment of a variable control 100 of the present invention for use as a research tool. The user assigns a range unit 185 corresponding to a research category. In the example shown in FIG. 8, the user assigned the range unit "AUTHOR". As described above, the user can enter the displayed value 145 directly into the text box 140 (e.g., using a keyboard) or the displayed value 145 can be a default displayed by the CPU, or a combination thereof (i.e., a default is displayed but can be edited by the user). The user can also use the slider control 150 to coarsely adjust the displayed value 145, as described above. In the example of FIG. 8, the slider control 150 increments the displayed value based on the letters of the alphabet. Thus, when the handle 155 is moved from a position corresponding to the letter "A" to a position corresponding to the letter "J", the name of the first author beginning with the letter "J" is displayed in the text box 140 (i.e., "JACOBS"). The spinner 160 is used to fine tune the displayed value 145. Thus, in the example where the slider control was used to coarsely adjust the displayed value to the letter "J", the spinner can be used to scan all author entries beginning with the letter "J".

It is understood that the embodiment shown in FIG. 8 is merely illustrative of an alternative embodiment of the present invention. Other embodiments will occur to those skilled in the art and are contemplated within the scope of the present invention. For example, various research categories can be provided, text strings can be displayed in the text box 140 and selected words from the text string can be selected for individual adjustment, the slider control can be incremented by words or subcategories within the research category displayed in the range box 180, etc.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A variable control displayed through a graphical user interface, said variable control comprising:
   a text box for displaying a value;
   a slider control linked to said text box, said slider control for coarse adjustments to said displayed value;
   a spinner linked to said text box, said spinner for fine adjustments to said displayed value; and
   a range box functionally linked to said text box, said range box for assigning a range unit to said displayed value.

2. The variable control of claim 1 wherein said range box is a pull-down menu having a plurality of predetermined range units listed therein.

3. The variable control of claim 1 wherein said range unit automatically updates when said displayed value is adjusted beyond a predetermined range limit.

4. The variable control of claim 1 wherein said slider position automatically updates when said displayed value is adjusted by a means other than by said slider.

5. The variable of control of claim 1 further comprising limits displayed at either end of said slider control, wherein said limits are automatically updated when said range unit is changed.

6. The variable control of claim 1 wherein said value displayed in said text box corresponds to a frequency setting for a spectrum analyzer which is linked to said variable control.

7. The variable control of claim 1 wherein said text box is selectable for keyboard entry of said displayed value.

8. The variable control of claim 1 wherein said displayed value is a numerical value.

9. The variable control of claim 1 wherein said displayed value is a character string value.

10. The variable control of claim 1 wherein selection of a digit of said displayed value limits the fine adjustments by said spinner to said selected digit.

11. The variable control of claim 1 wherein said spinner is an arrow pair.

12. A variable control displayed through a graphical user interface to adjust frequency settings on a pulse generator linked to said variable control, said variable control comprising:
   a plurality of text boxes, each of said plurality of text boxes displaying a numerical value corresponding to one of said frequency settings of said pulse generator;
   at least one range box corresponding to said plurality of text boxes, said at least one range box displaying a range unit therein;
   a slider control linked to said plurality of text boxes, said slider control for coarsely adjusting a selected one of said displayed numerical values when said slider control is operated;
   at least one spinner for finely adjusting a selected one of said displayed numerical values, whereby said frequency settings of said pulse generator are adjustable with said variable control.

13. The variable control of claim 12 wherein said at least one spinner is a plurality of spinners, each of said spinners being functionally linked to a different one of said plurality of text boxes and each of said spinners finely adjusting one of said displayed numerical values when said displayed numerical value is selected and said linked spinner is operated.

14. The variable control of claim 12 wherein said slider control further comprises a handle, said handle movable to operate said slider control.

15. The variable control of claim 12 further comprising a plurality of range boxes, each of said plurality of range boxes corresponding to at least one of said plurality of text boxes.

16. The variable control of claim 12 wherein said range unit is automatically updated when said displayed numerical value is adjusted beyond a predetermined range limit.

17. The variable control of claim 12 wherein said displayed numerical value is received by said text box from a keyed entry.

18. The variable control of claim 12 wherein a user-selected digit of said selected displayed numerical value is adjustable.

19. The variable control of claim 12 further including a real time measurement selector linked to said pulse generator.

20. A method for adjusting a parameter of a control element, said method comprising the steps of:
   displaying a value through a graphical user interface, said value corresponding to said parameter of said control element;
   changing said displayed value by coarse increments in response to input at a slider control displayed through said graphical user interface;
   changing said displayed value by fine increments in response to input at a spinner displayed through said graphical user interface;
   transmitting said changed value to said control element; and
   assigning a range unit to said displayed value in response to input at a range box displayed through said graphical user interface.

21. The method of claim 20 further comprising the steps of:
   automatically updating said range unit and the limits of said slider control when said displayed value is changed beyond a predetermined range limit; and
   automatically updating the position of said slider control when said displayed value is adjusted by another means.

22. The method of claim 21 wherein adjusting said value by another means is performed elsewhere on a network.

23. The method of claim 20 wherein at least one of the steps of changing said displayed value changes a selected digit of said displayed value.

24. The method of claim 20 wherein the step of transmitting said changed value to said control element is in real-time.

25. The method of claim 20 further including the step of receiving a request to apply said changed value, wherein the step of transmitting said changed value to said control element occurs only after said request to apply said changed value is received.

* * * * *